Figure 1:
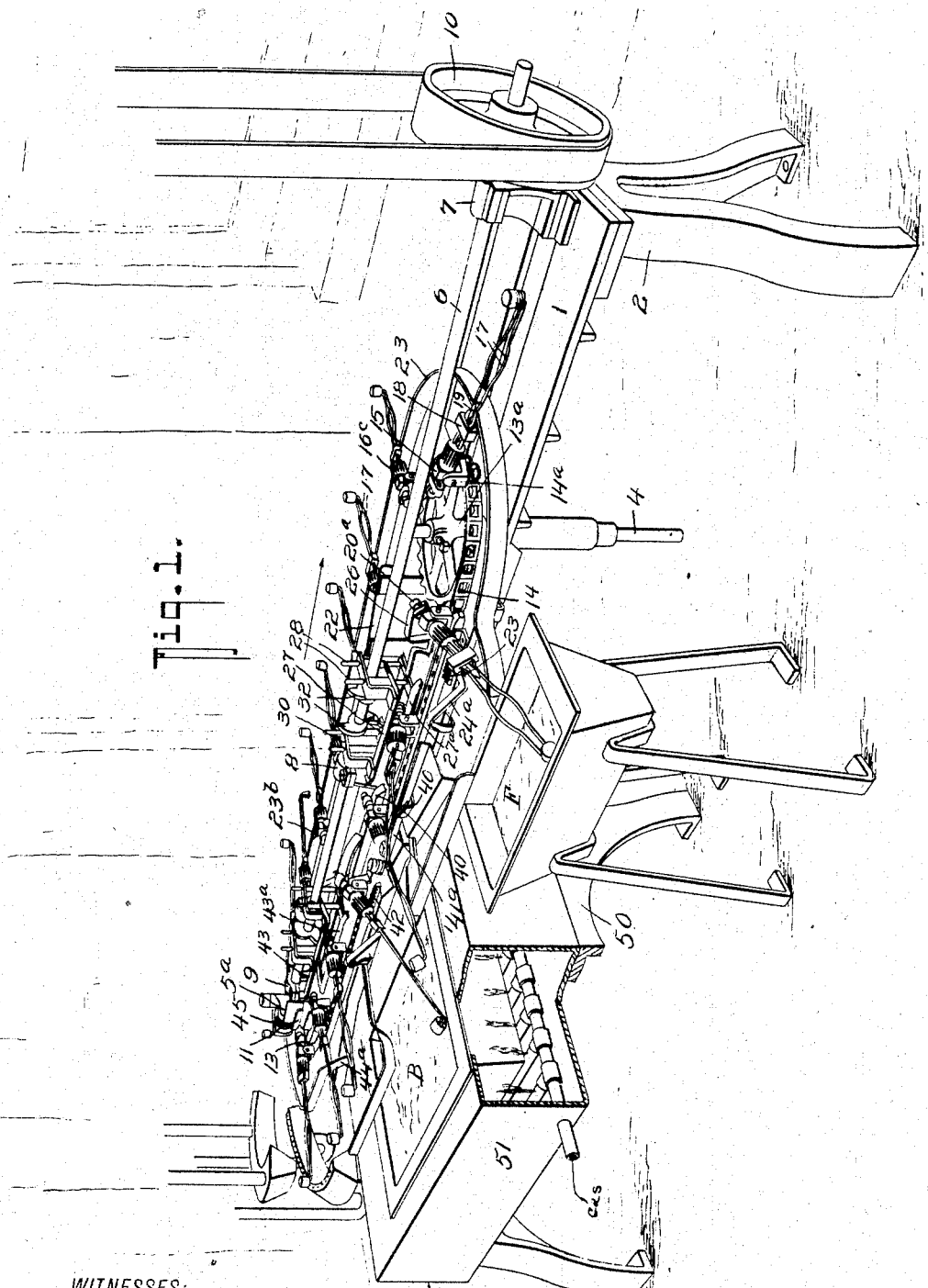

A. L. BERNARDIN.
RETINNING MACHINE.
APPLICATION FILED JUNE 22, 1906.

928,172.

Patented July 13, 1909.
6 SHEETS—SHEET 1.

WITNESSES:
F. C. Gibson.
John T. Schrott.

INVENTOR
Alfred L. Bernardin.
BY
Fred G. Dieterich & Co.
ATTORNEYS

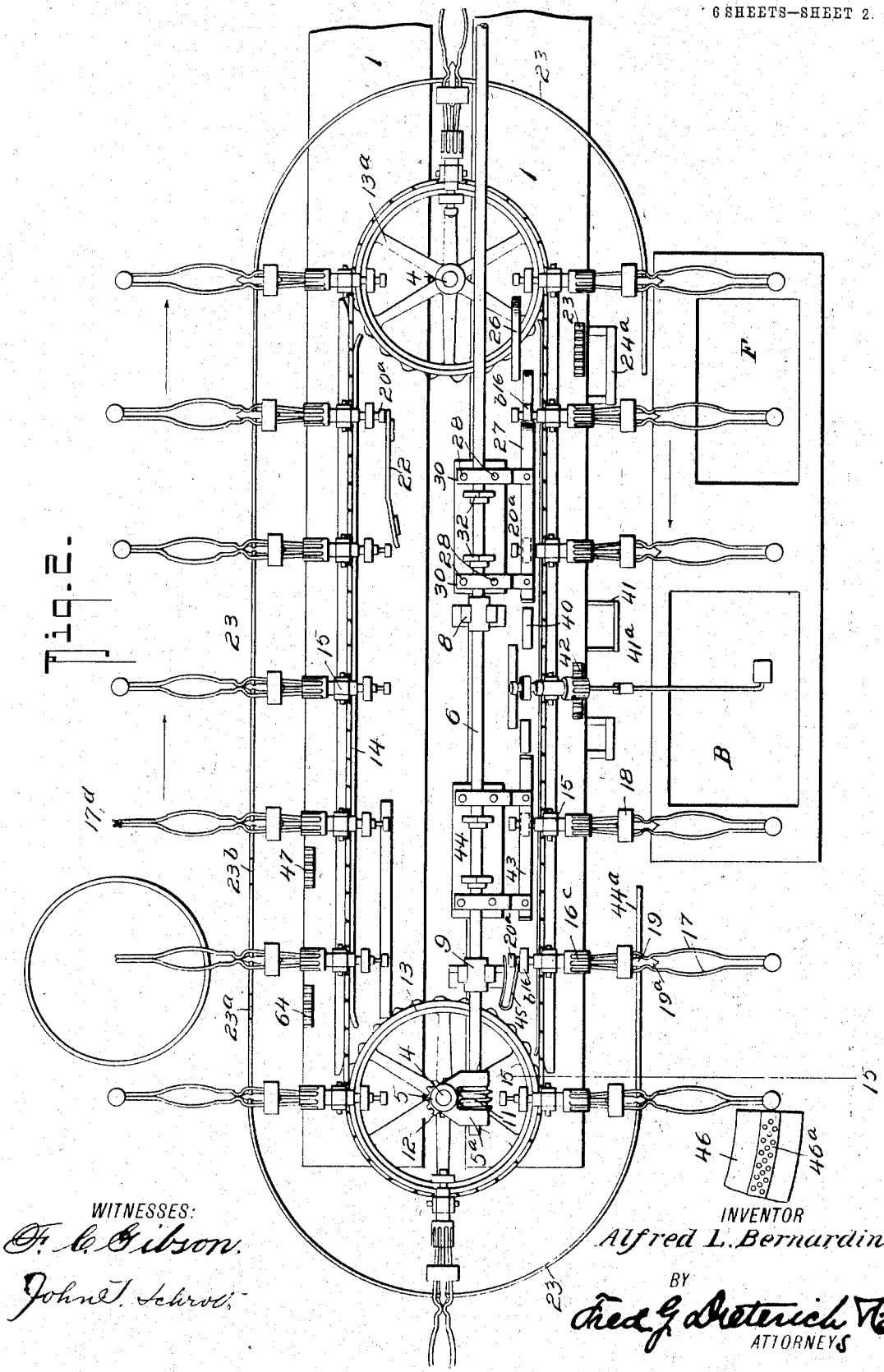

A. L. BERNARDIN.
RETINNING MACHINE.
APPLICATION FILED JUNE 22, 1906.
928,172.
Patented July 13, 1909.
6 SHEETS—SHEET 3.
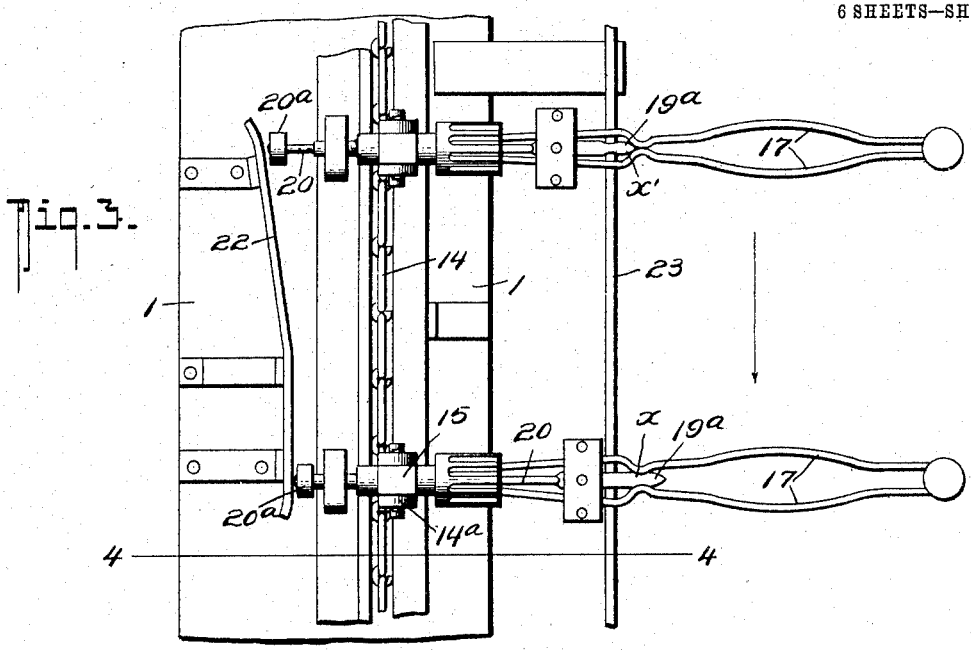
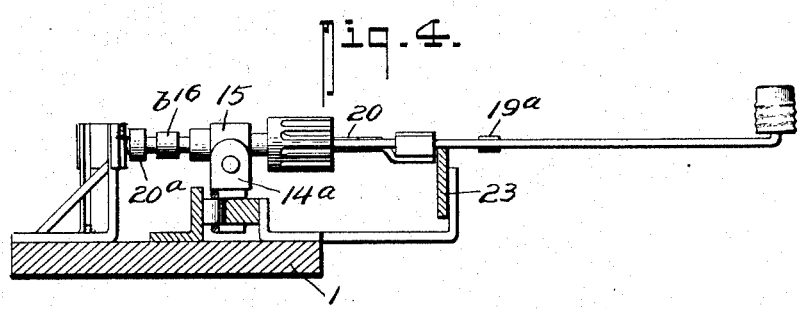
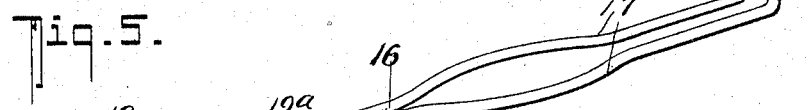
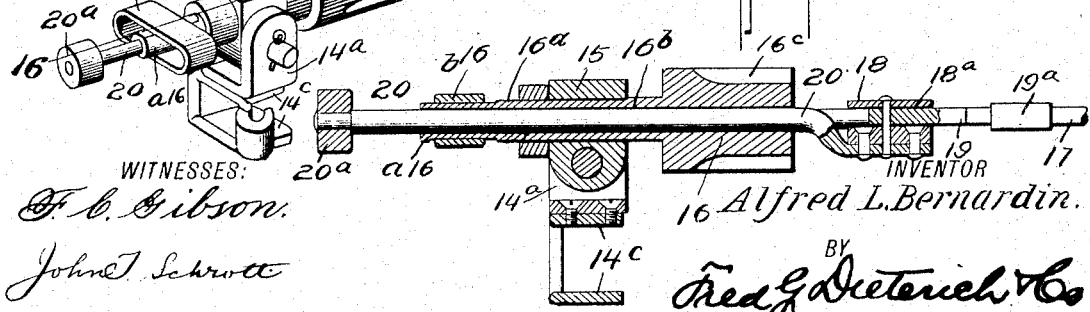
WITNESSES:
F. C. Gibson.
John T. Schrott
INVENTOR
Alfred L. Bernardin.
BY
Fred G. Dieterich & Co
ATTORNEY

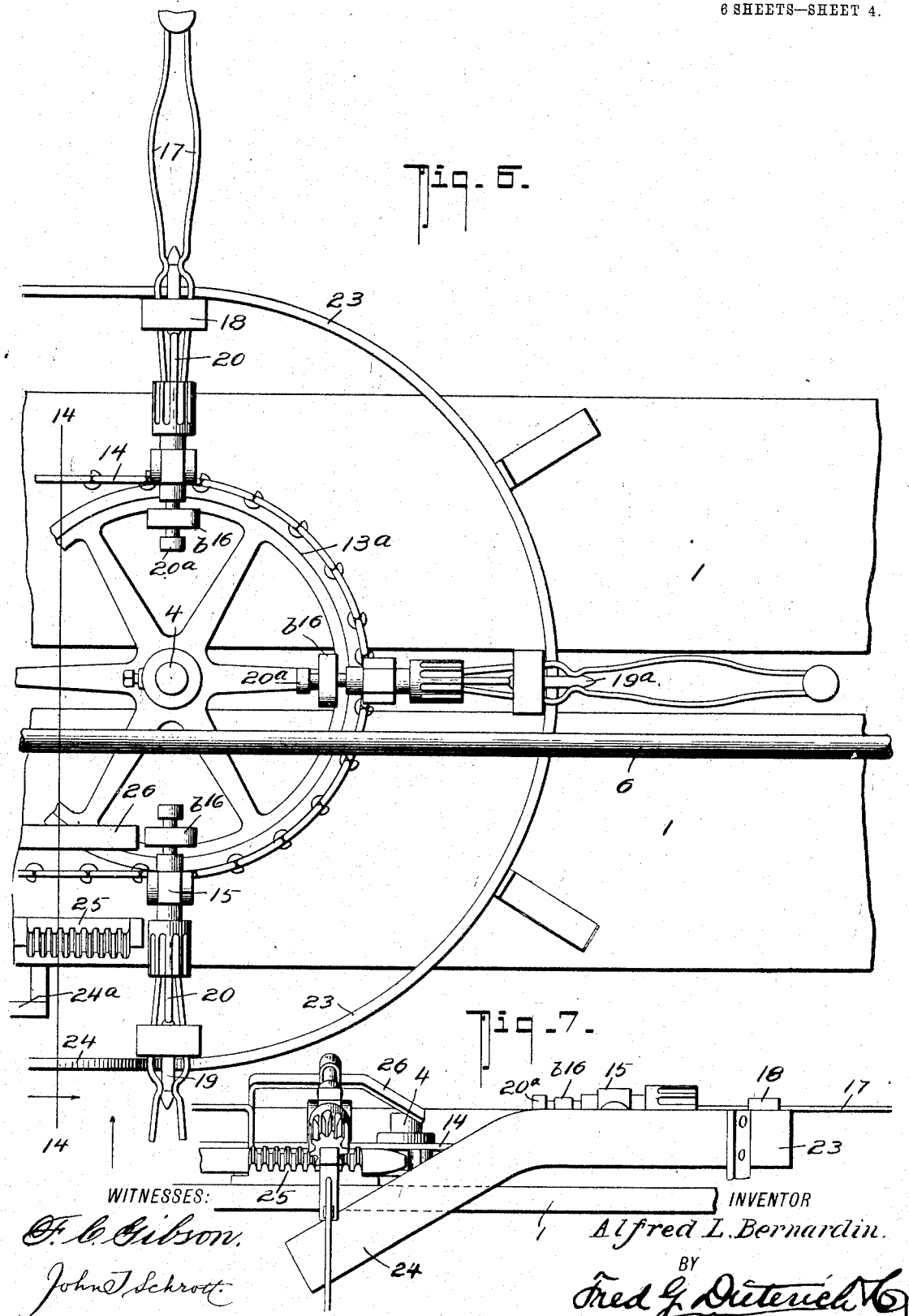

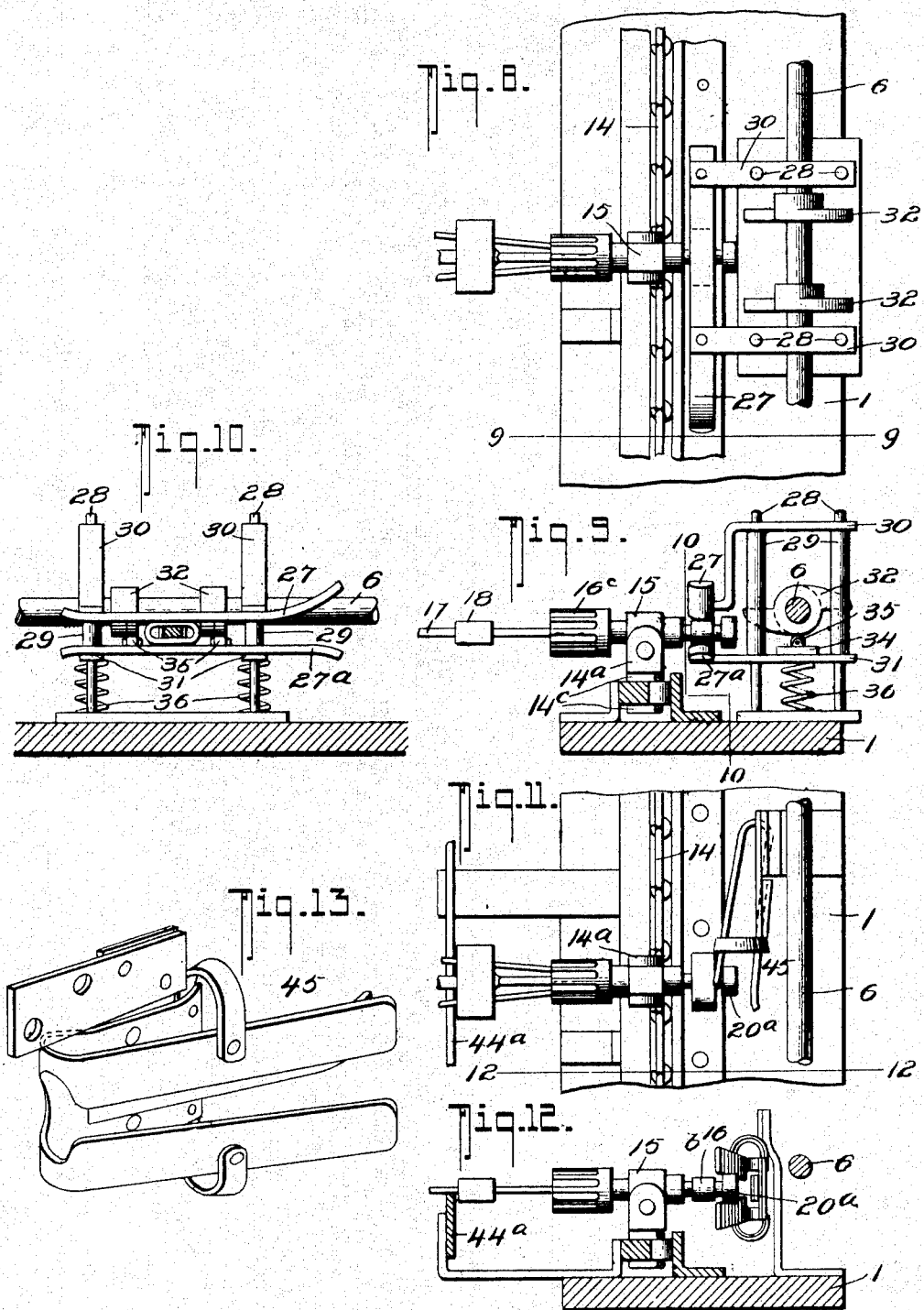

A. L. BERNARDIN.
RETINNING MACHINE.
APPLICATION FILED JUNE 22, 1906.
928,172.
Patented July 13, 1909.
6 SHEETS—SHEET 6.
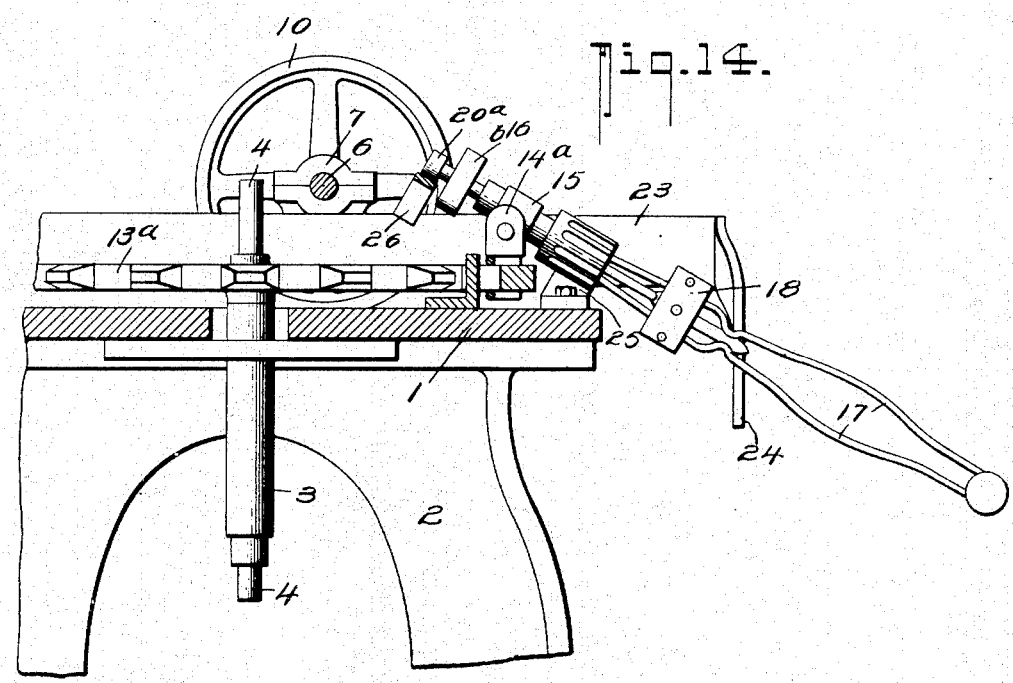
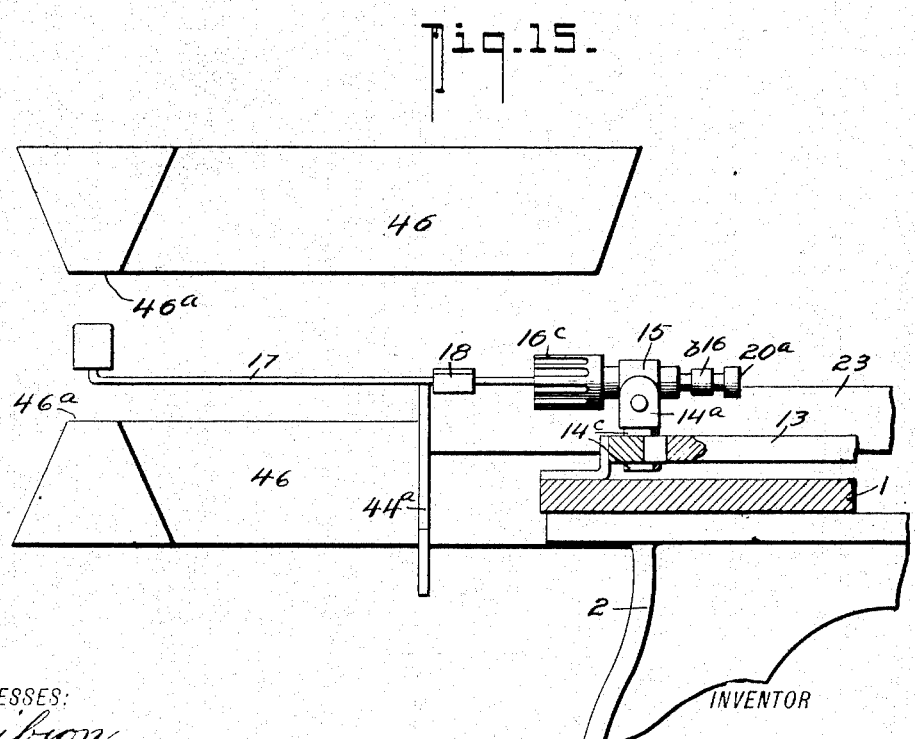
WITNESSES:
F. C. Gibson.
John T. Schrott.
INVENTOR
Alfred L. Bernardin
BY
Fred G. Dieterich
ATTORNEYS

UNITED STATES PATENT OFFICE.

ALFRED L. BERNARDIN, OF EVANSVILLE, INDIANA.

RETINNING-MACHINE.

No. 928,172.      Specification of Letters Patent.      Patented July 13, 1909.

Application filed June 22, 1906. Serial No. 322,838.

*To all whom it may concern:*

Be it known that I, ALFRED L. BERNARDIN, residing at Evansville, in the county of Vanderburg and State of Indiana, have invented a Retinning-Machine, of which the following is a specification.

My invention has for its object to provide a machine for retinning shells, bottle or jar closure caps and other metallic articles of manufacture, after they have been stamped up or otherwise formed, whereby to give such articles a luster or polish similar to a highly nickeled finish, and the said invention, in its generic nature comprehends a means for sustaining the articles to be finished, automatically conveying them to and immersing them in the coating solutions, freeing them from excess coating, drying the said coating and then discharging the said articles, means being also provided for effecting the several operations stated successively and uninterruptedly.

In its more complete nature, my invention embodies, in a machine of the character stated, an endless conveyer, a series of article holding members, upon which the articles are loosely mounted as the carriers are conveyed toward the fluxing and soldering baths, automatic means for causing the carriers to firmly grip the articles before they are immersed in the fluxing and soldering baths and another automatic means for releasing the grip of said carriers on the articles after they have been coated, whereby to permit of the ready removal of the coated articles from the carriers.

Again, my invention embodies, in a machine of the character stated, a means for imparting a rotary movement to the carriers as they dip the articles into the fluxing and soldering tanks, whereby to thoroughly immerse the entire surface of said articles and whereby, when coating hollow caps, to enter said caps with their open ends and turn them over and to an upright position as they pass through the fluxing and soldering baths.

Another and important feature of my invention lies in the coöperation with the endless conveyer and carrier devices, of means for dipping the said carriers at proper times into the fluxing and soldering solution and for agitating said carriers after they pass up out of the said solution whereby to remove all the surplus fluxing and coating substances, mechanism for adjusting the carriers to discharge the finished articles, and cooling means that operates on the articles after they leave the solder bath and before they reach their discharging point, whereby to thoroughly dry them before they leave the machine.

In its more subordinate feature, my invention consists in various details and peculiar combination of parts, all of which will be hereinafter fully described, specifically pointed out in the appended claims and illustrated in the acompanying drawings, in which:—

Figure 1, is a perspective view of my machine looking at the "dipping" side of the machine. Fig. 2, is a plan view. Fig. 3, is a detail plan view and illustrates the cam devices for expanding the carrier arms to grip the caps. Fig. 4, is a cross section thereof on the line 4—4 on Fig. 3. Fig. 5, is a perspective view of one of the cap carriers and the chuck devices combined therewith. Fig. 6, is a detail plan view of the forward end of the machine and illustrates the foremost carrier as about to engage the first tilting cam and the first turning rack. Fig. 7, is a front view of a portion of the same looking in the direction of the arrow 7 on Fig. 6. Fig. 8, is a detail plan view of a part of the machine and illustrates one of the carrier shaking mechanisms. Fig. 9, is a cross section thereof on the line 9—9 on Fig. 8. Fig. 10, is a similar view on the line 10—10 on Fig. 9. Fig. 11, is a detail plan view and illustrates the means for "drawing in" the carrier members for releasing their grip on the caps. Fig. 12, is a cross section on the line 12—12 on Fig. 11. Fig. 13, is a detail perspective view of the devices for "drawing in" the carrier arms to release their grip on the caps. Fig. 14, is a cross section on the line 14—14 on Fig. 6, and shows the carrier adjusted to dip the caps in the fluxing solution. Fig. 15, is a cross section of the machine taken on the line 15—15 on Fig. 2 and showing the blast or cooling devices. Fig. 16, is a longitudinal section of one of the carriers on the line 16—16 on Fig. 5.

In the practical application of my invention, a suitable bed frame or platform 1 is provided mounted at the opposite ends upon skeleton standards or frames 2—2, of suitable size and shape, and braced, preferably as shown in the drawings and at each end the platform 1 has a long pendent tubular bearing 3—3 either integral or otherwise fixedly connected with the platform, in each of which is journaled an upright shaft 4—4, the one at the rear end being a driven shaft, and having its upper end projected above the platform and journaled in a bracket 5 mounted on the platform 1 and which has a horizontal bearing $5^a$ that receives the rear end of a horizontally disposed drive shaft 6, also journaled in a bracket 7 projected upwardly from the front end of the machine and in intermediate brackets 8 and 9 as clearly shown in Fig. 1, by reference to which it will be seen the said shaft, at the front end carries a drive belt 10 to which power is transmitted in any approved manner. At the other, or rear end, the drive shaft 6 carries a worm gear 11 that meshes with a worm gear 12 on the rear driven shaft 4 and upon the said shaft 4 is mounted a horizontally disposed chain wheel 13 over which takes a chain belt 14, that also engages a chain wheel $13^a$ similar to wheel 13 mounted on the forward shaft 4, and in practice one or both of the pendent bearings for the shafts may be adjustable in the horizontal plane, to take up the slack in the conveyer belt.

To the conveyer belt is connected, to travel therewith, a series of carriers, upon which the caps or other articles to be tinned are fed by hand or otherwise, and which, after receiving the caps or other articles to be tinned, retain the said articles during the operation of tinning them and until they are in condition to be discharged as a finished product.

It should be here stated that in my machine, the carriers form substantially the equivalent of the human hand and arm in the manipulation of the cap or other article to be tinned, since they first dip and thoroughly immerse the cap in the acid or fluxing tank, then lift it out of the tank and thoroughly shake it to remove the surplus flux, then dip and thoroughly immerse the cap or other article in the solder bath, then lift it out of the bath, thoroughly shake it to remove the surplus coating, then hold or sustain it in position to be subjected to a cooling blast and finally drop the same, when completed, into a receiver.

The mechanisms for actuating the carriers to perform the various movements above outlined, form the essentials of my invention and since the construction of all of the carrier devices and their operation, as they are conveyed is the same, a detailed description of a single one of the said carrier devices and the different means for successively and at predetermined times coacting with the said carrier devices will suffice for all of said carriers and the actuating means therefor.

Referring now more particularly to Figs. 5 and 7, it will be seen the carrier consists of a U shaped yoke bearing $14^a$, fixedly connected to and projected vertically from the endless chain belt in which is rockably mounted a block 15 adapted for tilting in a plane transversely of the chain belt and in which is rotatably mounted the spindle $16^a$ of the rotary carrier head or chuck 16 which has a central longitudinal bore $16^b$ and a cylindrical gear member $16^c$ for the reason hereinafter explained.

The hollow spindle $16^a$ is formed with an extension $a^{16}$ to which is fixedly connected, transversely thereof, a flat guide $b^{16}$, the purpose of which will hereinafter appear.

17—17 designate the carrier arms, in the nature of stout spring rod members whose inner ends are detachably connected to the gear end of the chuck to rotate therewith. The arms 17—17 are parallelly disposed for a distance from their inner ends and pass through an elongated slot $18^a$ of a block 18 slidably mounted on the said parallel arm portions, and at some distance beyond the block, the arms 17—17 are bent inwardly toward each other and formed with abrupt shoulders $17^a$—$17^a$ that under normal conditions abut, whereby to lock against the inner end of the arrow like head $19^a$ of a spreader member 19 fixedly connected to the sliding block 18.

From the contacting shoulder portions, the carrier arms extend some distance, are bowed to permit the coating solution to freely drop off the arms, and terminate in substantial parallel portions, whose ends, when my machine is especially provided for turning caps or other hollow articles, are bent up at right angles to form combined receivers and gripper fingers $17^c$—$17^c$ whose terminals are preferably forked as at $17^d$ to provide for the minimum contact of the said grippers with the article carried thereby.

The sliding block that carries the spreader device is connected with an actuating rod 20 that extends through the tubular bore of the chuck and has a fixed head $20^a$ at its inner end which coacts with certain cam devices and guides presently fully explained, it being here understood that when the rod 20 is at its inward or normal position, the carrier arms are in a closed position but when the rod is forced outward the sliding block 18 moves with it and causes the head $19^a$ to spread the carrier arms whereby to cause their gripper ends to firmly contact or grip the articles to be tinned.

At the part directly under the U shaped yoke $14^a$, the chain belt has a pair of outwardly projected parallel lugs $14^c$—$14^c$ for engaging with guides for holding the member $14^a$ from tilting outward, other coacting guides that engage the inner side of the chain being provided for holding the member 14ª from swinging inward, in other words, means are thereby provided for sustaining the bearings 14 in a fixed vertical position whereby to hold them from transverse flexure at points between the chain wheels, said holding means being however omitted where the chain passes around the chain or belt drive wheels.

Having thus generally outlined the arrangement of the endless conveyer, its actuating means and the carriers joined therewith, a further detailed description of my complete machine is now best explained as follows:

Referring now to Figs. 1 and 3 of the drawings, and assuming the carrier to be in the normal condition, that is, with its ends closed to freely receive the cap thereon, the spreader device being now at its inward position and the said carrier as moving in the direction of the arrow on Fig. 1, the head 20ª of the spreader rod 20 will now be moving into engagement with a cam plate 22, see Fig. 3, so shaped that as the carrier moves forward it pushes rod 20 outward and forces the arrow head 19ª to the position shown at $x'$ on Fig. 3 which spreads the gripper ends of the carrier arms to firmly grip the cap thereon and thereby immovably hold the same, it being understood that while I have shown the ends of the arms as especially formed to grip hollow caps, that when other shapes of closure members or articles are to be tinned the said ends may be constructed to suit the requirements for gripping such articles.

From the point where the caps pass between the cooling devices hereinafter referred to around to the front end of the dipping side of the machine, the carriers are held in a horizontal position and to sustain them thus, a vertical guide flange 23 extends lengthwise the platform and around the rear and front end thereof upon which the said carrier arms rest as shown and as they pass toward the fluxing or acid holding tank.

F designates the fluxing tank located at or near the point where the conveyer chain leaves the forward chain wheel and at such point the flange 23, on which the carrier arms are supported as they approach the fluxing tank is inclined downwardly as at 24 to permit the carrier to tilt down by its own weight to bring the cap or other article to be tinned into the fluxing solution.

It should be here stated that the carriers as they pass from the point where they discharge the finished product along the feed side of the machine are held from rotary movement by reason of the carrier arms riding on a guide member 23, see Figs. 1 and 4, which sustains the carrier arms in a proper position for conveniently placing the caps or other article to be tinned thereon.

25 designates a short rack that extends lengthwise of the machine and is so located with respect to the inclined or guide portion 24, that the gear head of the chuck meshes with it so soon as the front end of the carrier is about to dip into the fluxing solution, but before the carrier has swung down to the limit of its dipping thrust.

By reason of such correlative arrangement of the several parts, it will be apparent by referring now to Fig. 1 that as the conveyer and carrier now advance, the carrier will be completely rotated in a forward direction and as it does the hollow side of the cap will be dipped through the solution in the manner of dipping a cup and thus not only provide for a thorough immersion of the cap, but also the bringing of the cap back to its upright position to be in position to be similarly dipped when it is passed through the soldering bath.

To positively hold the carrier with its cap dipped during the rotation thereof, the end of the rod 20 engages a guide 26 which it disengages as soon as the gear head leaves the rack, and the carrier arms engage the upwardly inclined guide 24ª which raises the carrier up out of the flux and in position for engaging the shaker mechanism.

Immediately after the carrier leaves the guide 24ª, the transverse guide block $b^{10}$ enters a throatway formed by the guides 27—27ª of the first shaking mechanism, the construction of which is clearly shown in Figs. 8, 9 and 10, and which generally consists of two sets of upright posts 28—28 disposed in the longitudinal plane of the machine and that straddle the drive shaft of the machine. Upon these posts are mounted sleeves 29—29 to the upper and lower ends of which are joined transverse plates 30 and 31, the upper ones 30 of which bend down and carry the upper guide 27, the other guide 27ª being joined to the front ends of the lower cross plates 31 as clearly shown in Fig. 9, from which, and Fig. 8, it will be also observed the drive shaft carries a pair of rotary knocker cams 32—32 adapted to impart a sharp vibratory movement to the guide carrying plates 30 and 31 by engaging a connecting bar 34 that joins the lower cross plates 31, carrying impacting rollers 35—35, with which the cams 32 intermittently engage to jolt the guides 27—27ª vertically and thereby impart sudden vibratory or shaking motions to the carrier during the time its block $b^{10}$ passes between the guides 27—27ª, the return movement to the said guides being effected by stout springs 36.

To avoid a too sudden impact or jar of the carriers that might tend to injure them or throw off the caps, the impacting rollers may be in the nature of cushion rollers, which would effect a certain amount of resiliency in the impacts or sudden blows of the cams.

At this point it should be stated, the full function of the guides for holding the U shaped member from lateral tilting comes in during the camming and uncamming of the spreader devices and also during the shaking operation since to provide for the proper vibratory or shaking action of the carrier, it is necessary that it have a fixedly mounted fulcrum bearing.

It will be noticed that during the operation of shaking off the surplus flux, the cap is in its upright position and elevated, and in the desired position to be carried to and immersed in the soldering bath B, which operation is automatically effected as follows: As the inner end of the carrier passes from between the shaking guides 27—27$^a$ the member $b^{16}$ engages an upwardly inclined guide 40, which causes that part of the guide arms in advance of the rotary gear head to engage an outer guide 41 having a downwardly inclined depression 41$^a$ which imparts a partial forward rotary movement to the carrier whereby to bring the closed end of the cap to face the soldering bath and bring the rotary gear head into mesh with a second rack member 42, thereby giving a complete rotation to the cap as it is passed through the solder, the said parts having such correlative arrangement that so soon as the gear head disengages the rack the carrier arms engage an upwardly inclined guide to lift the cap out of the solder, and bring its guide block $b^{16}$ in position to pass between the oppositely disposed guides 43—43$^a$ of a second shaking mechanism 44, the construction of which and its operation is precisely similar to that of the first shaking devices hereinbefore described, said devices freeing the carrier and the cap of the surplus solder, it being understood that during the entire operation of passing the cap through the fluxing bath F, soldering bath B and the two sets of shaking mechanisms, the said cap is held firmly gripped by the carrier arms.

From the second shaking devices the tinned cap is passed to cooling means, and since the setting of the solder is rapid, to prevent the cap adhering or becoming soldered to the said carrier arms, I provide for releasing the grip of the carrier fingers on the cap immediately after the carriers leave the second set of shaking devices and for that purpose, immediately after the inner end of the carrier passes from between the guides 43—43$^a$ the front end engages an upwardly inclined guide 44$^a$ that brings the carriers back to a horizontal position and the rear head 20$^a$ in position to engage with the uncamming or drawing in devices that pull the carrier arm spreader back.

In the drawings, see Figs. 11, 12 and 13, I have shown the "drawing in" devices in the nature of a slotted guide 45 into which the neck of the rear spreader extension passes, see Fig. 11, and which is positioned to draw on the spreader rod and pull the spreader head back to the normal position see $x'$, Fig. 3, and thus now leave the cap loosely mounted on the carrier fingers and in position to pass between the opposing perforated discharge faces 46$^a$ of a pair of oppositely disposed blast chambers 46 curved on an arc concentric with the axis of the rear conveyer belt wheel, whereby to provide for a long cooling blast on the tinned cap and sufficient to dry the same before it passes to the discharging point, which is located in the front or feed side of the machine, see Fig. 16, by reference to which it will be seen that during the time the caps are passing the air discharging devices, the carrier arms are sustained on the guide flange 23. As the carriers pass around to the front or feed side of the machine with their arms resting flatwise upon the flange 23, the gear of the chuck or head portion engages a short rack 46, in line with a V-shaped notch 23$^a$ in the flange whereby to turn the carrier over to drop the cap into a suitable receiver, the notch 23$^a$ being provided to prevent springing the carrier arms up during this movement. After the carrier has been turned over and the cap discharged, it pass forward a short distance when the chuck head gear engages another short rack 47 in line with another notch 23$^b$ in the flange, and is turned up in position to receive a new cap, it being understood when it assumes the last stated position the arms of the chuck head gear engage the guide 23 that holds the carriers from rotation.

The fluxing and solder tanks F and B in practice are suitably mounted, the tank B over a furnace in any approved manner. In the drawing I have shown them mounted on a skeleton frame 50 on which is also supported a furnace 51 which is preferably heated through the medium of gas burners.

By reason of providing for turning the cap to enter the soldering material, open end first, all danger of an imperfect covering of both inside and outside of the cap is avoided. This is an advantageous feature, since, should the cap be drawn through the solder closed end first, there would be danger of splashing, which would prevent a full flow of the solder over the entire inner surface.

From the foregoing description, taken in connection with the accompanying drawings, it is believed the complete construction and operation of my machine will be readily apparent.

While as a convenient means of disclosing my invention I have shown the parts of my machine combined in the manner illustrated in the drawings, I desire it understood that I do not restrict myself to the exact construction and arrangement of the parts as shown and described in detail, since under my invention and particularly the scope of the appended claims, these details of structure may be materially modified or varied without departing from my invention.

By reason the the general correlation of parts, they can be economically made and assembled and broken portions replaced, and further, since the operations of conveying, dipping, drying, cooling and discharging the articles to be retinned are entirely automatic and continuous, no skilled labor is required for manipulating the same since all the manual labor that is necessary, is the placing of the caps on the carrier fingers.

Having thus described my invention, what I claim and desire to secure by Letters Patent, is:—

1. In a machine of the character described, in combination with the fluxing bath and a conveyer; of a carrier movable with the conveyer, and automatic means for moving the carrier into the bath and simultaneously imparting a rotary movement thereto.

2. A machine of the character described, having automatic means for conveying and immersing the articles to be retinned in the coating solutions and another automatic mechanism for shaking said conveying and immersing means to remove the surplus coating.

3. In a machine of the character described, coating and soldering solutions, automatic means for conveying and for immersing the article to be tinned in the coating solutions at predetermined times, another automatic means for adjusting the conveying and immersing means to discharge the finished product, and a means for cooling the tinned product located between the soldering bath and the point of discharge of the finished product.

4. In a machine of the character described, in which is included a fluxing and soldering tank, automatic means for gripping the article to be tinned, conveying it over the said tanks, immersing the articles into the tanks as they pass thereover and for shaking off the surplus solder and the surplus flux as they rise up out of the said tanks.

5. In a machine of the character described, in combination with a conveyer, and a carrier joined therewith, and having means for gripping the article to be tinned; of an automatic means for simultaneously moving the carrier to dip the article into the solder tank and imparting a complete rotation to the said carrier.

6. The combination with the platform having a vertical guide flange, an endless horizontal conveyer operable within the guide flange, a series of carrier arms having a hinged connection with the conveyer and having their outer ends held to ride on the guide flange, said flange having depressions in line with the fluxing and soldering bath whereby to permit the carriers to automatically dip into and rise out of the fluxing and soldering solutions as they pass thereover.

7. In a machine for retinning caps and like hollow bodies, in combination with a conveyer, carriers connected thereto having means at their outer ends for gripping the caps; automatic mechanism for simultaneously moving the carriers to dip the caps into the floating fluid and adjusting the said carrier to move the cap through the said fluid with the open end forward.

8. In a machine of the character described, in combination with an endless conveyer, a series of chuck heads connected thereto, a carrier rotatably and pivotally mounted in each chuck head and projected laterally from the conveyer, said carrier having means at the outer end for gripping the article to be tinned, and automatic means for tilting and rotating the said carriers at predetermined times.

9. In a machine of the character described, in combination with the supporting frame; a series of chuck heads pivotally and rotatably mounted on the conveyer and projected laterally therefrom, a carrier comprising a pair of normally closed spring rods, arms secured to and projected outwardly from the rotary chuck head, said arms having their outer ends shaped to support the articles to be tinned, a means carried by each chuck for spreading the carrier arms, mechanism on the supporting frame for actuating the spreader means and automatic devices for tilting the carriers at predetermined times.

10. In a machine of the character described, an endless conveyer, chuck heads pivotally and rotatably mounted on the conveyer and projected laterally therefrom, said chuck head having a central bore, a pair of normally closed spring rod arms fixedly connected to the chuck head and projected outwardly therefrom, a spreader head movable between the rod arms, and including an extension movable in and projected beyond the chuck head bore, means on the supporting frame for engaging the inner end of the extension and intermittently moving the spreader outwardly and inwardly, and automatic means for tilting the carriers at predetermined times.

11. In a machine for the purposes described, in combination with the supporting frame including a flange for supporting the outer ends of the carriers and the endless conveyer; a series of chuck heads pivotally and rotatably mounted on the conveyer, said chuck head including an outwardly extended cylindrical gear head, having a flattened portion adapted to engage with the supporting flange at predetermined times to hold the chuck head from rotation, said carriers including arms projected outwardly from the chuck heads and automatic means for tilting the carriers at predetermined times.

12. In a machine of the character described, an endless conveyer, a drive shaft for actuating it, a series of carrier arms projected laterally from and pivotally connected to the conveyer to tilt vertically, automatic means for tilting said carriers at predetermined times, a shaking mechanism actuated by the drive shaft with which the inner ends of the carriers engage after they are tilted upwardly out of the baths.

13. In combination with the conveyer, the carriers pivotally connected thereto and projected laterally therefrom, said carriers including a guide portion at the inner end, a shaking mechanism consisting of a vertically reciprocable frame having a guideway with which the guides on the inner ends of the carriers engage when the carriers are swinging up out of the baths.

14. In a machine of the character described, in combination with the supporting frame, the endless conveyer and the laterally projected carriers pivotally and rotatably connected to the conveyers to swing vertically; a rest flange on the frame for supporting the outer ends of the carriers, said flange having a pair of V-shaped notches in its bearing edge and means for engaging the inner ends of the carriers to frictionally hold their outer ends to engage in the V-shaped notches whereby to rotate the carriers first to a discharging position and then to a receiving position.

15. A machine for the purposes described, comprising an endless conveyer, carriers adjustably connected therewith, and projected laterally thereon, the carriers including adjustable receivers, automatic means for adjusting the receivers at predetermined times, to first grip and then release their grip on the articles therein, automatic means for tilting and rotating the carriers at intervals, means for shaking the carriers after they rise up out of the coating baths and a means for cooling the tinned articles after they leave the soldering bath, and a drive mechanism for effecting a continuous successive operation to the several means stated.

16. In a machine of the character described, an automatic means for conveying the articles to be finished toward and immersing them in the coating solutions, then shaking the coated articles, then cooling them, then discharging the finished product, and a drive mechanism for effecting the several operations successively and uninterruptedly.

17. In a machine of the character described, an endless conveyer, rotatable and pivoted carriers connected thereto, means for tilting the carriers to dip in the fluxing and soldering tanks, and automatic means for imparting a rotary motion to the carriers as they are dipped in the said tanks.

18. In a machine of the character described, in combination with a fluxing bath and a carrier; automatic means for moving the carrier into the bath and imparting a rotary movement thereto while in the bath.

ALFRED L. BERNARDIN.

Witnesses:
FRED G. DIETERICH,
ELLA MACCORMICK.